United States Patent

[11] 3,622,121

[72] Inventors Shigeru Watabe
Kariya-shi;
Katsushi Nakashima, Aichi-ken; Tooru Hamada, Kariya-shi, all of Japan
[21] Appl. No. 5,870
[22] Filed Jan. 26, 1970
[45] Patented Nov. 23, 1971
[73] Assignee Aisin Seiki Kabushiki Kaisha
Kariya, Japan
[32] Priorities Jan. 29, 1969
[33] Japan
[31] 44/7654;
Feb. 5, 1969, Japan, No. 44/10482

[54] VALVE MECHANISM
9 Claims, 4 Drawing Figs.
[52] U.S. Cl. ..................................................... 251/333
[51] Int. Cl. ..................................................... F16k 25/00
[50] Field of Search ............................................ 251/333, 334, 332

[56] References Cited
UNITED STATES PATENTS
| | | | |
|---|---|---|---|
| 1,679,779 | 8/1928 | Oberhuber ................. | 251/334 |
| 2,489,623 | 11/1949 | Delany ....................... | 251/333 X |

FOREIGN PATENTS
| | | | |
|---|---|---|---|
| 9,853 | 1890 | Great Britain ................ | 251/333 |

*Primary Examiner*—Arnold Rosenthal
*Attorney*—Pierce, Scheffler & Parker

ABSTRACT: A valve mechanism having a rubber valve head member and a cooperating seat member having a passage therethrough, either of which is provided on its acting surface with circular ridge means to surround the passage in the seat member for cutting off flow of fluid through the passage. A plurality of wartlike projections may be disposed on one of the members in a circle inside or outside the circular ridge means to define a deformation of the valve head in its operating position and to assist return of the valve head to its rest position. Either or both the circular ridge means or the wartlike projections may be provided on the seat member or the valve head member.

INVENTORS
Shigeru Watabe
Katsushi Nakashima
Tooru Hamada

INVENTORS
Shigeru Watabe
Katsushi Nakashima
Tooru Hamada

BY
Pierce, Schiffler & Parker
ATTORNEYS 3,622,121

VALVE MECHANISM

BACKGROUND OF THE INVENTION

This invention relates to valve mechanisms and more particularly to the acting surfaces of valve heads or valve seats capable of use, for example, in master cylinders of hydraulic brake systems.

It is the general practice to connect the master cylinder with a liquid reservoir as well as with the liquid transmission pipe lines and to incorporate a valve mechanism which permits communication between the liquid reservoir and the master cylinder when the master piston is returned to its initial position after the performance of a control operation but which cuts off communication between the reservoir and the master cylinder immediately a control movement is initiated.

For achieving the above-mentioned purpose it has been proposed heretofore to employ a valve mechanism comprising a valve head having a flat-acting surface which is spring-urged on toward its seat and which is located in the end wall of the master cylinder opposed to the master piston, said valve having a stem which extends into and is slidable lengthwise in an aperture in the piston in the direction of movement of the latter, which stem has a head or enlargement which is engaged by the piston to raise the valve from its seat just before the piston reaches a position at which the volume of the chamber is at its maximum.

Hydraulic control mechanisms having valve mechanisms in accordance with the above however is open to the disadvantages that the roughness of the flat surface of the valve seat may prevent the closing of the valve and to overcome this disadvantage imposes a heavy burden on the manufacture to thereof an accurately finished flat surface of the valve seat. The requirement of such accuracy raises many troublesome questions as to the manner of manufacturing which usually must be performed on the hallow an recessed end portion of the master cylinder.

The present invention has for its object the provision of an improved hydraulic control valve mechanism of the kind hereinbefore referred to which is not subject to the disadvantages aforesaid by making the surface of a valve head of its seat as hereinafter described.

SUMMARY OF THE INVENTION

In accordance with the present invention, the valve head is made of resilient material such as rubber and the acting surface of the head or its valve seat has circular ridge means provided thereon. The passage in valve seat is encircled by the ridge means to cutoff flow of fluid when control movement of the valve head is initiated. The acting surface may additionally be provided inside or outside the ridge means with a plurality of wartlike raised portions in a circle the height of which is limited not to exceed that of the ridge means so that the warts can suitably define a deformation which may occur in the ridge means or on the flat surface of the valve head, as the ridge means may be disposed either on the valve head or the seat and further can effectively serve to assist the valve head to return to its rest position immediately after the performance of the control operation. The raised portions or warts may supply similar service whether they are disposed on the valve head or on its seat. In the present invention the same advantages may furthermore be obtained whether either the ridge means or the warts are disposed on the acting surface of the seat while providing the other on the surface of the valve head.

It is the primary object of the present invention to provide a valve mechanism having the features outlined in the preceding paragraph, and it is also an object of the invention to provide such a valve mechanism which is compact in structure, economical in construction, and easily and conveniently installed in the field for use with an existing fluid control system especially a hydraulic brake system.

BRIEF DESCRIPTION OF THE DRAWINGS

The present invention is illustrated in the accompanying drawings, in which.

DESCRIPTION OF THE PREFERRED EMBODIMENT

Figure 1:
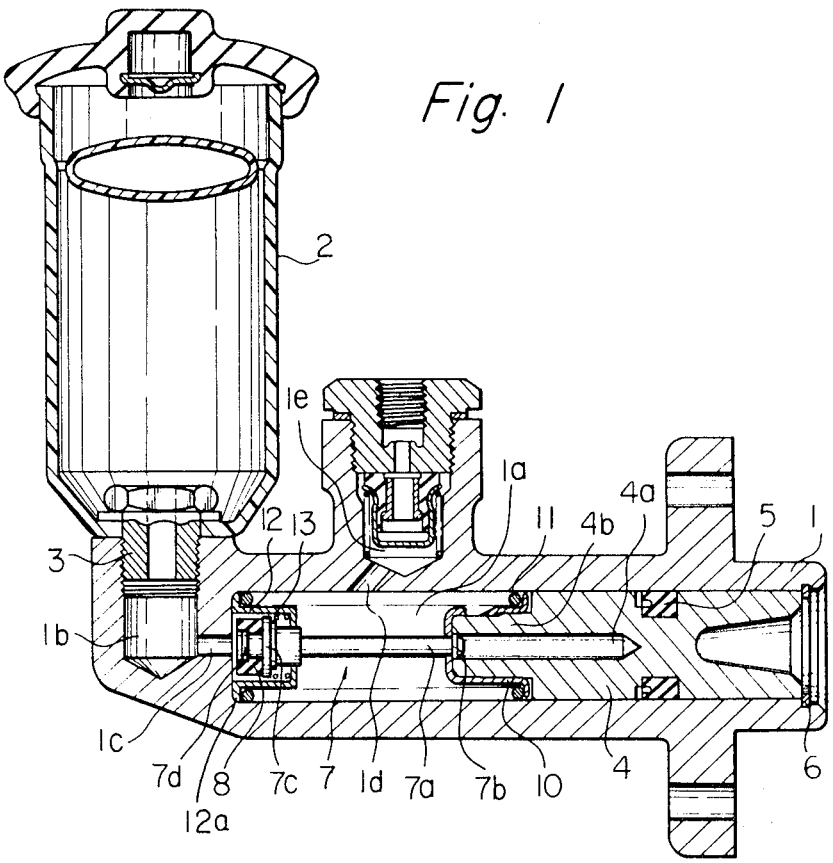
FIG. 1 is a section through a combined cylinder and reservoir unit, and through the valve head of the present invention in its unseated position.
Figure 2:
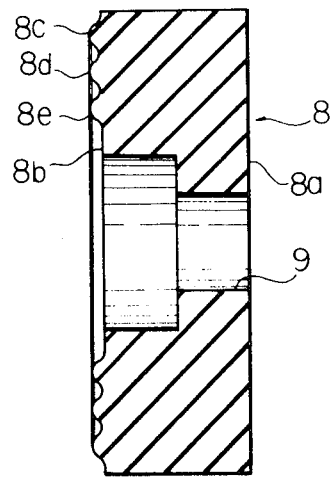
FIG. 2 is a greatly enlarged view of the valve head illustrated in FIG. 1.

According to the embodiment of the invention illustrated in FIG. 1 the closed end of the master cylinder 1 has communication by way of an axially disposed hole 1c of relatively small diameter with a passage 1b leading to a reservoir 2 for the hydraulic fluid. Adjacent the closed end, the master cylinder 1 is provided with a laterally disposed passage 1d which communicates by way of an outlet 1e and pipelines (not shown) with the actual hydraulically operated means such as wheel brake cylinders. The axially arranged hole 1c cooperates with a valve head 8 made of a relatively soft rubber and of a relatively large diameter in comparison with the diameter of the said hole 1c, the acting face 8b of the aforesaid valve head (FIG. 2) being of circularly and plurally ridged formation as shown by reference characters from 8c to 8e. The rubber valve head 8 is carried at one end of an axially disposed stem 7a of a member 7 the other end of which is provided with an enlargement 7b which slides in an axially disposed hole 4a formed in the master piston 4, the said enlargement 7b being prevented normally from being withdrawn from the hole in the master piston by the marginal portion of a cup 10 which fits over a portion 4b projecting from the acting end of the master piston 4. The aforesaid cup 10 also serves as an abutment for one end of a relatively strong spring 11 for returning the master piston 4 to its rest position, the other end of the said return spring 11 abutting a flanged portion 12a of a cage 12 which is located adjacent the closed end of the master cylinder 1 and which contains the valve head 8. The valve head 8 is firmly clamped at its inwardly flanged portion 9 between two collars 7c and 7d to move together with the stem 7a. The face of the valve head 8 opposite to the circularly ridged face 8b is backed by the collar 7c of a large diameter than that of the said collar 7d, between which and the presented face of the cage 12 is disposed a light spring 13 which tends to urge the rubber valve head 8 continually to the closing position, said spring 13 being insufficient however to overcome the force of atmospheric pressure acting on the face 8b of the valve head 8. The master piston 4 is reciprocably mounted within the cylinder 1 and is suitably sealed by a packing 5 for placing fluid under pressure when the piston is moved to the left by any suitable power, being prevented by a snapring 6 from being withdrawn from the master cylinder 1. The tubular bolt 3 serves as an assembling member of the reservoir 2 and the master cylinder 1 while permitting the flow of fluid therethrough.

In operation, the reservoir, cylinder, tubing and wheel brake cylinders, or other devices to be operated by fluid pressure, are first filled with fluid in usual manner of by bleeding and pumping. Thereafter, when the piston rests in its normal position (see FIG. 1), the valve head 8 is maintained open by being pulled apart from its seat, but when the piston 4 is moved from its normal position, only a slight distance, the valve head 8 is permitted to seat, pressing the rubber ridged acting face 8b against the seat to prevent the escape of fluid from the cylinder to the reservoir during the pressure stroke of the piston. Upon the return of the piston to its normal position, the superior strength of the spring 11 over the spring 13 causes the valve head 8 to be unseated from its seat to open the passageway between the cylinder and the reservoir.

In view of the fact that the valve head 8 is made of soft rubber and acting face 8b of the aforesaid valve head 8 is of a circularly and plurally ridged formation, the relatively small area of abutting of the acting face ensures the exertion on the rubber ridges of a relatively greater hydraulic closing force when the rubber valve head 8 is moved to the closing position so that any roughness of the flat seat i.e., the face of the closed end of the master cylinder, tends to sink into and to become enveloped by the soft rubber ridges.

By the fact that the roughness of the face of the cylinder closed end tends to sink into and to become enveloped by the ridges good sealing properties can be effected to prevent the escape of the fluid from the cylinder to the reservoir so that the closing action of the valve head 8 is not affected by some inaccuracy of the seat which may occur during manufacture.

Figure 3:
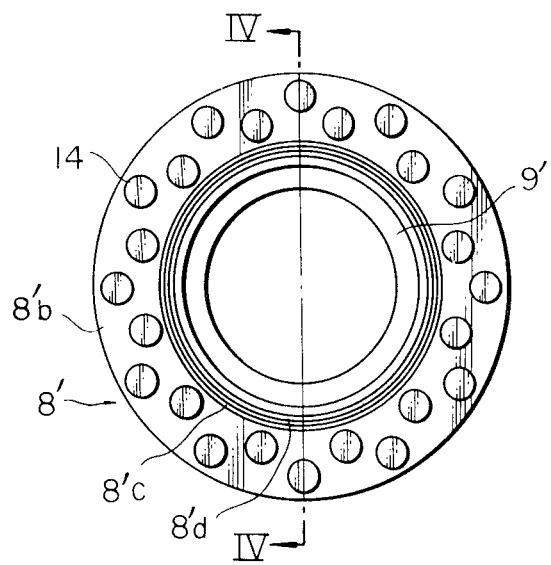
FIG. 3 is a elevation of an alternative embodiment of the invention.
Figure 4:
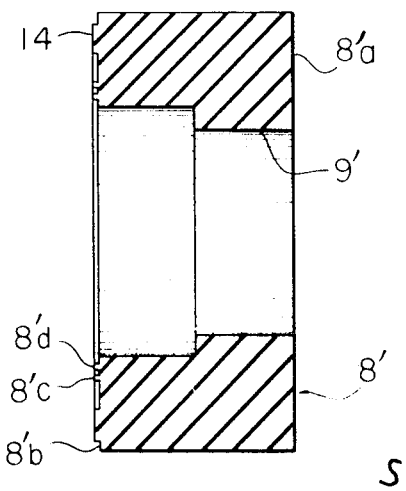
FIG. 4 is a sectional view on the line IV—IV of FIG. 3.

In the embodiment of the invention illustrated in FIG. 3 and FIG. 4, the acting face 8'b of the valve head 8' has similarly, for example, two ridges and has additionally a plurality of wartlike raised portions 14 arranged in a circle around the ridges.

It has been found effective that the height of the projection of the ridges should be equal to or slightly greater than that of the warts. The number of the warts and the size of each of the warts should be calculated so as to define a deformation of the two circular ridges when the valve head seats.

If during the return movement of the master piston 4 there is a tendency to create a vacuum in the valley or groove defined by the two ridges due to an enlargement of the size of the valley, the restoring force of the rubber warts will supply additional returning force to the valve head which will prevent the accidental delay of the return of the valve head.

While we have shown and described our invention with respect to certain details of the construction, by the embodiments illustrated, it is to be understood that the modifications hereinbefore explained but not illustrated will be apparent to those who skilled in the art and need no illustration.

Again, while the invention has been described in considerable detail, we do not wish to be limited to the precise configuration shown and described or explained; and it is our intention to cover hereby all adaptations, modifications thereof which come within the practice of those skilled in the art to which the invention relates.

We claim:

1. A valve mechanism comprising a valve seat member having a passage therethrough surrounded by an operating surface and a movable valve head member of resilient material having a surface which cooperates coaxially with the operating surface of said valve seat member to effect closure of the passage, one of said members being provided on its cooperating surface with circular ridge means concentric to the axis of said member and one of said members being provided on its cooperating surface with a plurality of wartlike portions arranged circularly of and concentrically to the axis of said member, said circular ridge means and said raised portions being provided at different radii from the axis of said members, the height of said raised portions in an axial direction being not greater than the height of said circular ridge means in an axial direction, whereby the circular ridge means of one member forms an effective seal with the other member by defined deformation of the resilient material and the circularly arranged raised portions on one member assist in opening said valve mechanism by the resilient force inherent in the resilient material of said valve head member.

2. A valve mechanism as claimed in claim 1, wherein the concentric ridge means is provided on the cooperating surface of the valve head member.

3. A valve mechanism as claimed in claim 1, wherein the concentric ridge means is provided on the cooperating surface of the valve seat member.

4. A valve mechanism as claimed in claim 1, wherein the radius of the circularly arranged raised portions is less than the radius of the concentric ridge means.

5. A valve mechanism as claimed in claim 1, wherein the radius of the concentrically arranged raised portions is greater than the radius of the concentric ridge means.

6. A valve mechanism as claimed in claim 2, wherein the raised portions are provided on the cooperating surface of the valve seat member.

7. A valve mechanism as claimed in claim 2, wherein the raised portions are provided on the cooperating surface of the valve head member.

8. A valve mechanism as claimed in claim 3, wherein the raised portions are provided on the cooperating surface of the valve head member.

9. A valve mechanism as claimed in claim 3, wherein the raised portions are provided on the cooperating surface of the valve seat member.

* * * * *